(12) United States Patent
Lee

(10) Patent No.: US 11,136,080 B2
(45) Date of Patent: Oct. 5, 2021

(54) SYSTEM AND METHOD FOR MOUNTING TAILGATE

(71) Applicants: HYUNDAI MOTOR COMPANY, Seoul (KR); KIA MOTORS CORPORATION, Seoul (KR)

(72) Inventor: Seung Ho Lee, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 77 days.

(21) Appl. No.: 16/682,429

(22) Filed: Nov. 13, 2019

(65) Prior Publication Data

US 2020/0079451 A1 Mar. 12, 2020

Related U.S. Application Data

(62) Division of application No. 15/601,260, filed on May 22, 2017, now Pat. No. 10,507,879.

(30) Foreign Application Priority Data

Dec. 7, 2016 (KR) .................. 10-2016-0165744

(51) Int. Cl.
*B62D 65/06* (2006.01)

(52) U.S. Cl.
CPC .................. *B62D 65/06* (2013.01)

(58) Field of Classification Search
CPC .................................................. B62D 65/06
See application file for complete search history.

(56) References Cited

U.S. PATENT DOCUMENTS

| 2014/0366352 A1 | 12/2014 | Jang |
| 2015/0068004 A1 | 3/2015 | Hur |
| 2017/0361885 A1* | 12/2017 | Macri ............... B25J 9/1687 |
| 2018/0079460 A1* | 3/2018 | Shimoyama ......... B62D 65/024 |
| 2019/0001450 A1* | 1/2019 | Brueckl ................... B60J 10/45 |

FOREIGN PATENT DOCUMENTS

| JP | 5486342 B2 | 5/2014 |
| KR | 10-1405229 B1 | 6/2014 |
| KR | 10-1449329 B1 | 10/2014 |

OTHER PUBLICATIONS

Notice of Allowance in corresponding U.S. Appl. No. 15/601,260 dated Aug. 16, 2019.
Non-Final Office Action in corresponding U.S. Appl. No. 15/601,260 dated Apr. 26, 2019.

* cited by examiner

*Primary Examiner* — Moshe Wilensky
(74) *Attorney, Agent, or Firm* — Morgan, Lewis & Bockius LLP

(57) ABSTRACT

A system for automatically mounting a tailgate on a vehicle body includes: an X-direction regulation jig that measures an X-direction position of the tailgate and regulates the X-direction position; a Y-direction regulation jig that measures a Y-direction position of the tailgate and regulates the Y-direction position; a tailgate loading and mounting robot that corrects the X-direction position and the Y-direction position of the tailgate and mounts the tailgate on a side of a roof panel of the vehicle body; and a nut assembly robot that automatically assembles a nut to a hinge of the tailgate.

1 Claim, 15 Drawing Sheets

SYSTEM AND METHOD FOR MOUNTING TAILGATE

CROSS-REFERENCE TO RELATED APPLICATION

This application is a Divisional application of U.S. patent application Ser. No. 15/601,260 filed on May 22, 2017, which claims the benefit of priority to Korean Patent Application No. 10-2016-0165744 filed on Dec. 7, 2016, in the Korean Intellectual Property Office, the disclosure of which is incorporated herein in its entirety by reference.

TECHNICAL FIELD

The present disclosure relates to a system and a method for mounting a tailgate, and more particularly, to a system and a method for accurately and easily mounting tailgates of various vehicles on vehicle bodies.

BACKGROUND

A system for mounting a tailgate attaches the tailgate on a side of a roof panel of a vehicle body through a loading robot using an external mounting jig including an X-direction regulation arm and a Y-direction regulation arm. Then, the system automatically bolts a nut to a hinge of the loaded tailgate through an automatic hinge-nutting robot, thereby finishing an assembling work.

However, according to a conventional system for mounting a tailgate, since an external mounting jig is used, the loading position of the tailgate may not be accurate. Accordingly, since the tailgate is not accurately mounted on a predetermined position, the mounting quality may be degraded.

In addition, since the external mounting jig is used, history of the mounting quality may not be managed, which may be disadvantageous to quality management. Further, since the number of units to be attached to the mounting jig is limited due to the constraint of a mounting space, tailgates of various vehicles may not be compatibly mounted. Therefore, when a new model of a vehicle is additionally produced, additional facility investment costs may be required.

SUMMARY

The present disclosure has been made to solve the above-mentioned problems occurring in the prior art while advantages achieved by the prior art are maintained intact.

An aspect of the present disclosure provides a system and a method for mounting a tailgate, capable of accurately and easily mounting tailgates of various vehicles on vehicle bodies, improving mounting quality of the tailgate, and reducing facility investment costs.

The technical problems to be solved by the present inventive concept are not limited to the aforementioned problems, and any other technical problems not mentioned herein will be clearly understood from the following description by those skilled in the art to which the present disclosure pertains.

According to an exemplary embodiment of the present disclosure, a system for automatically mounting a tailgate on a vehicle body may include: an X-direction regulation jig that measures an X-direction position of the tailgate and regulates the X-direction position; a Y-direction regulation jig that measures a Y-direction position of the tailgate and regulates the Y-direction position; a tailgate loading and mounting robot that corrects the X-direction position and the Y-direction position of the tailgate and mounts the tailgate on a side of a roof panel of the vehicle body; and a nut assembly robot that automatically assembles a nut to a hinge of the tailgate.

According to another exemplary embodiment of the present disclosure, a method for automatically mounting a tailgate on a vehicle body may include: moving the tailgate to a mounting standby position by a tailgate loading and mounting robot; interposing an X-direction regulation jig between the tailgate and a roof panel by a transfer robot; measuring an X-direction distance between the tailgate and the X-direction regulation jig by a first detection sensor; calculating a correction value for an X-direction position of the tailgate based on the measured X-direction distance; adjusting the X-direction position of the tailgate by the tailgate loading and mounting robot; and automatically assembling a nut to a hinge of the tailgate by a nut assembly robot.

According to another exemplary embodiment of the present disclosure, a method for automatically mounting a tailgate on a vehicle body may include: moving the tailgate to a mounting standby position by a tailgate loading and mounting robot; moving a Y-direction regulation jig by a transfer robot such that the Y-direction regulation jig is adjacent to a lateral side of the tailgate; measuring a Y-direction distance between the lateral side of the tailgate and the Y-direction regulation jig by a second detection sensor; calculating a correction value for a Y-direction position of the tailgate based on the measured Y-direction distance; adjusting the Y-direction position of the tailgate by the tailgate loading and mounting robot and regulating a Y-direction position of a Y-direction regulation arm by the Y-direction regulation jig; and automatically assembling a nut to a hinge of the tailgate by a nut assembly robot.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, an embodiment of the present disclosure will be described with reference to accompanying drawings. The size of each element and the thickness of a line, which are illustrated in accompanying drawings, may be exaggerated for the purpose of convenience or clarity, and do not reflect an actual size. In addition, the terms employed for the description of the present disclosure are defined based on functions of relevant elements in the present disclosure. Accordingly, the terms may be varied with the intent and the custom of a user and an operator. The terms are defined based on the inventive concept throughout the whole specification.

Figure 1:
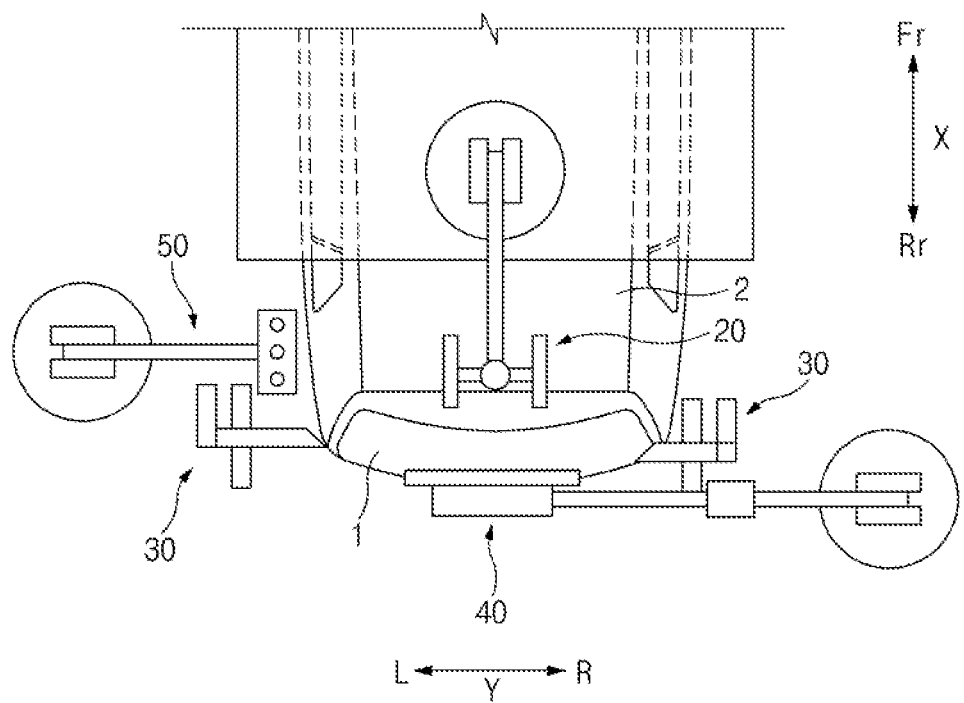
FIG. 1 is a plan view illustrating a system for mounting a tailgate, according to an embodiment of the present disclosure.

Referring to FIG. 1, according to an embodiment of the present disclosure, a system 10 for mounting a tailgate 1 includes: at least one X-direction regulation jig 20 which measures an X-direction position of the tailgate 1 and regulates the X-direction position; at least one Y-direction regulation jig 30 which measures a Y-direction position of the tailgate 1 and regulates the Y-direction position; a tailgate loading and mounting robot 40 which corrects the X-direction position and the Y-direction position of the tailgate 1 and mounts the tailgate 1 on a side of a roof panel 2 of a vehicle body; and a nut assembly robot 50 which automatically assembles a nut to a hinge of the tailgate 1.

Figure 2:
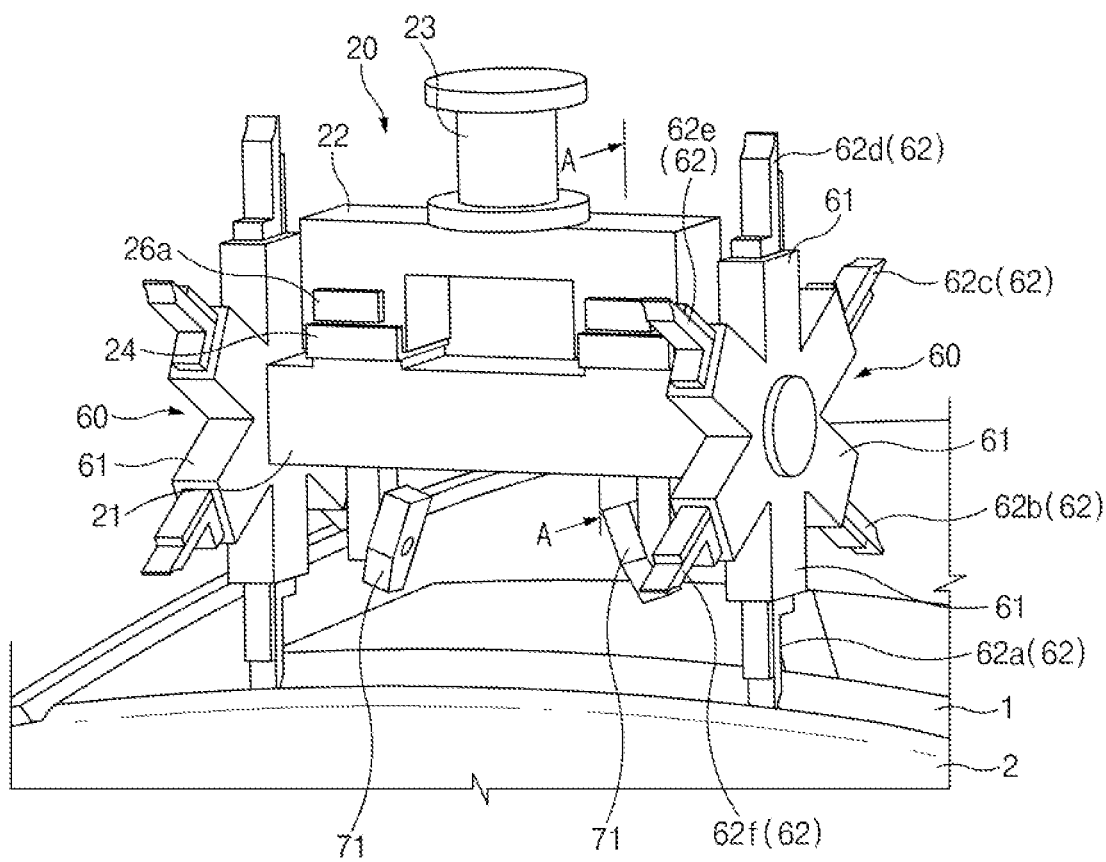
FIG. 2 is a perspective view illustrating an X-direction regulation jig of the system for mounting the tailgate, according to an embodiment of the present disclosure.
Figure 3:
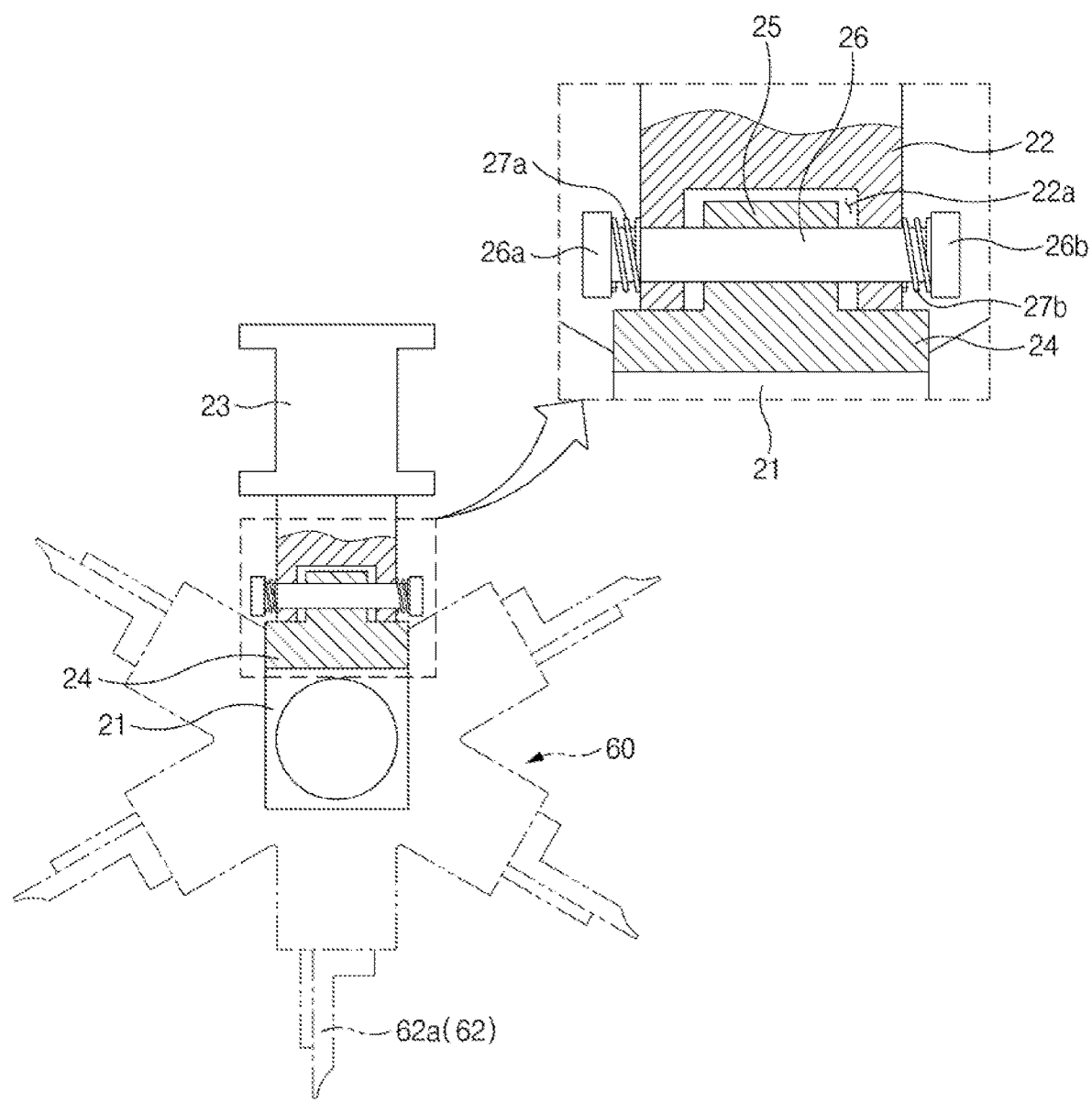
FIG. 3 is a sectional view taken along line A-A of FIG. 2.

Referring to FIGS. 2 and 3, the X-direction regulation jig 20 may include a first block 21 coupled to at least one X-direction regulation arm 62, a second block 22 mounted such that the second block 22 is movable relative to the first block 21, and a coupling part 23 mounted on an upper end of the second block 22.

A mounting part 60 may be rotatably mounted on at least one end of the first block 21, and the X-direction regulation arm 62 may be mounted on the mounting part 60 to regulate the X-direction position of the tailgate 1. The X-direction regulation arm 62 may include a plurality of X-direction regulation arms 62a, 62b, 62c, 62d, 62e, and 62f which are circumferentially spaced apart from each other.

The mounting part 60 may have a plurality of arms 61 which radially extend. The X-direction regulation arms 62a, 62b, 62c, 62d, 62e, and 62f may be individually mounted on the relevant arms 61. The X-direction position (e.g., a distance S between the tailgate 1 and the roof panel 2) of the tailgate 1 may be accurately regulated by the X-direction regulation arms 62a, 62b, 62c, 62d, 62e, and 62f. Accordingly, the mounting quality of the tailgate 1 may be improved.

Meanwhile, the dimensions and the shapes of the X-direction regulation arms 62a, 62b, 62c, 62d, 62e, and 62f may be mutually differently formed corresponding to vehicle models. As described above, as the X-direction regulation arms 62a, 62b, 62c, 62d, 62e, and 62f are provided, the distances between tailgates 1 and roof panels 2 of various vehicles may be uniformly regulated.

For example, a first X-direction regulation arm 62a may be configured to regulate the distance between a tailgate 1 and a roof panel 2 of an A-model vehicle. A second X-direction regulation arm 62b may be configured to regulate the distance between a tailgate 1 and a roof panel 2 of a B-model vehicle. A third X-direction regulation arm 62c may be configured to regulate the distance between a tailgate 1 and a roof panel 2 of a C-model vehicle. A fourth X-direction regulation arm 62d may be configured to regulate the distance between a tailgate 1 and a roof panel 2 of a D-model vehicle. A fifth X-direction regulation arm 62e may be configured to regulate the distance between a tailgate 1 and a roof panel 2 of an E-model vehicle. A sixth X-direction regulation arm 62f may be configured to regulate the distance between a tailgate 1 and a roof panel 2 of an F-model vehicle.

Each of the X-direction regulation arms 62a, 62b, 62c, 62d, 62e, and 62f may have a regulation member 63 which regulates the distance between the tailgate 1 and the roof panel 2. The regulation member 63 may include a first contact surface 63a, which is contactable with a rear end of the roof panel 2, and a second contact surface 63b which is contactable with an upper end of the tailgate 1. According to an embodiment, the first contact surface 63a may have a curve shape corresponding to the rear end of the roof panel 2, and the second contact surface 63b may have a flat shape corresponding to the upper end of the tailgate 1.

According to an embodiment of the present disclosure, a reinforcement member 64 may be attached to the regulation member 63. The support stiffness of the regulation member 63 may be enhanced by the reinforcement member 64. The reinforcement member 64 may closely make contact with the second contact surface 63b of the regulation member 63.

According to an embodiment of the present disclosure, as illustrated in FIG. 2, a pair of mounting parts 60 may be mounted symmetrically to each other on both ends of the first block 21. Accordingly, the distance between the tailgate 1 and the roof panel 2 may be more accurately regulated.

An actuator (not illustrated) such as a driving motor may be mounted in the first block 21, and the mounting parts 60 may be rotated by the actuator.

A guide block 24 may be fixedly mounted on a top surface of the first block 21. The guide block 24 may be mounted such that the guide block 24 is movable relative to the second block 22. Accordingly, the first block 21 and the second block 22 may be movable relative to each other in an X direction through the guide block 24.

A support block 25 is fixed to an upper end of the guide block 24. The support block 25 may have a length shorter than that of the guide block 24.

A guide bar 26 may pass through the support block 25 and may extend in the X direction. A pair of stoppers 26a and 26b may be provided symmetrically to each other on both ends of the guide bar 26. The stoppers 26a and 26b may have diameters greater than that of the guide bar 26. The stoppers 26a and 26b may include a first stopper 26a, which is positioned toward a front portion Fr of a vehicle, and a second stopper 26b which is positioned toward a rear portion Rr of the vehicle.

The second block 22 may be movable relative to the first block 21 as the second block 22 is guided along the guide block 24. The second block 22 may be formed therein with a lower portion thereof with a receiving space 22a in which the support block 25 is received. The guide bar 26 may be exposed to the outside through the second block 22.

The guide bar 26 may have at least one of springs 27a and 27b which performs an elastically support operation such that X-direction positions of the first block 21 and the second block 22 are changed relative to each other. The springs 27a and 27b may be interposed between the stoppers 26a and 26b of the guide bar 26 and the second block 22.

The springs 27a and 27b may be mounted symmetrically to each other on both ends of the guide bar 26. The springs 27a and 27b may include a first spring 27a positioned toward the front portion Fr of the vehicle and a second spring 27b positioned toward the rear portion Rr of the vehicle. The first spring 27a may be interposed between the first stopper 26a and the second block 22, and the second spring 27b may be interposed between the second stopper 26b and the second block 22. As described above, the springs 27a and 27b performs an elastically support operation such that the first block 21 and the second block 22 move relative to each other. Accordingly, when the X-direction regulation jig 20 is separated after the mounting of the tailgate 1 finished, the first block 21 and the second block 22 may be returned to the original positions thereof.

Figure 8:
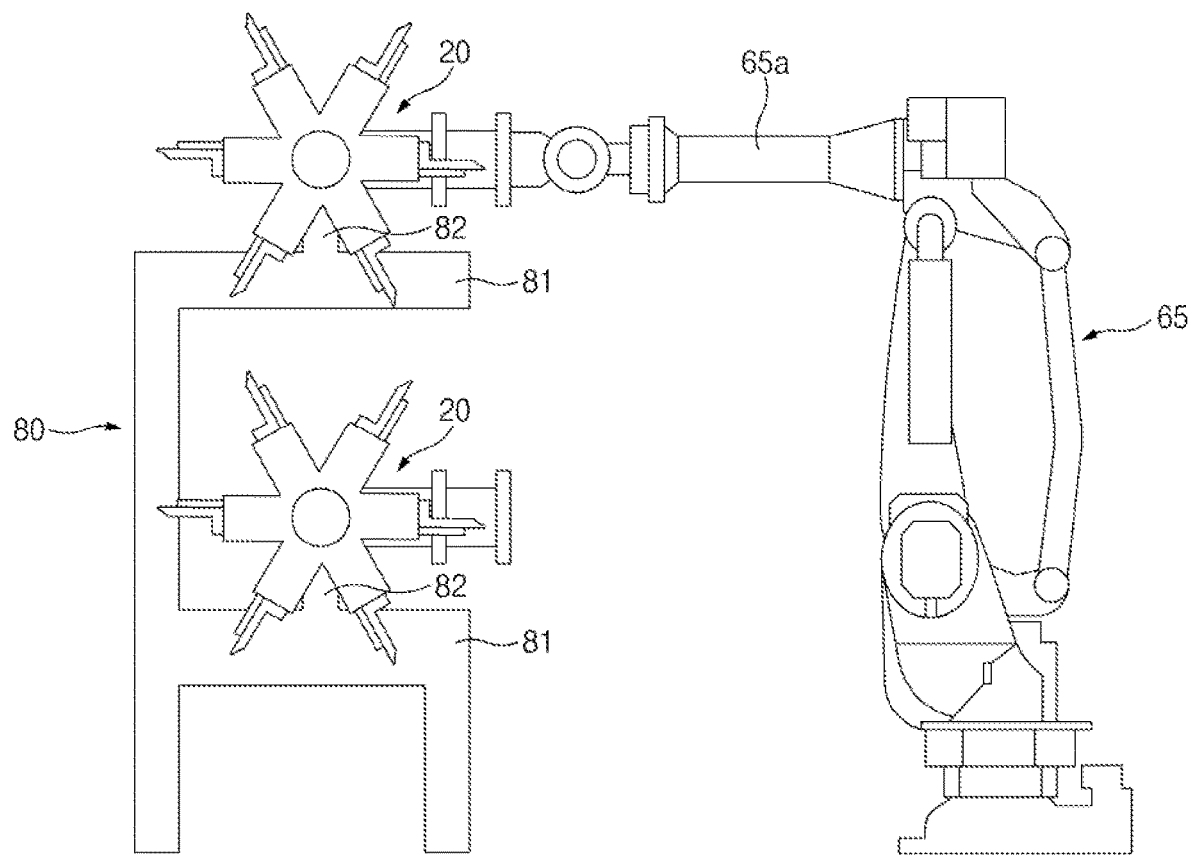
FIG. 8 is a side view illustrating a storage rack in which the X-direction regulation jig of the system for mounting the tailgate is stored, according to an embodiment of the present disclosure.
Figure 9:
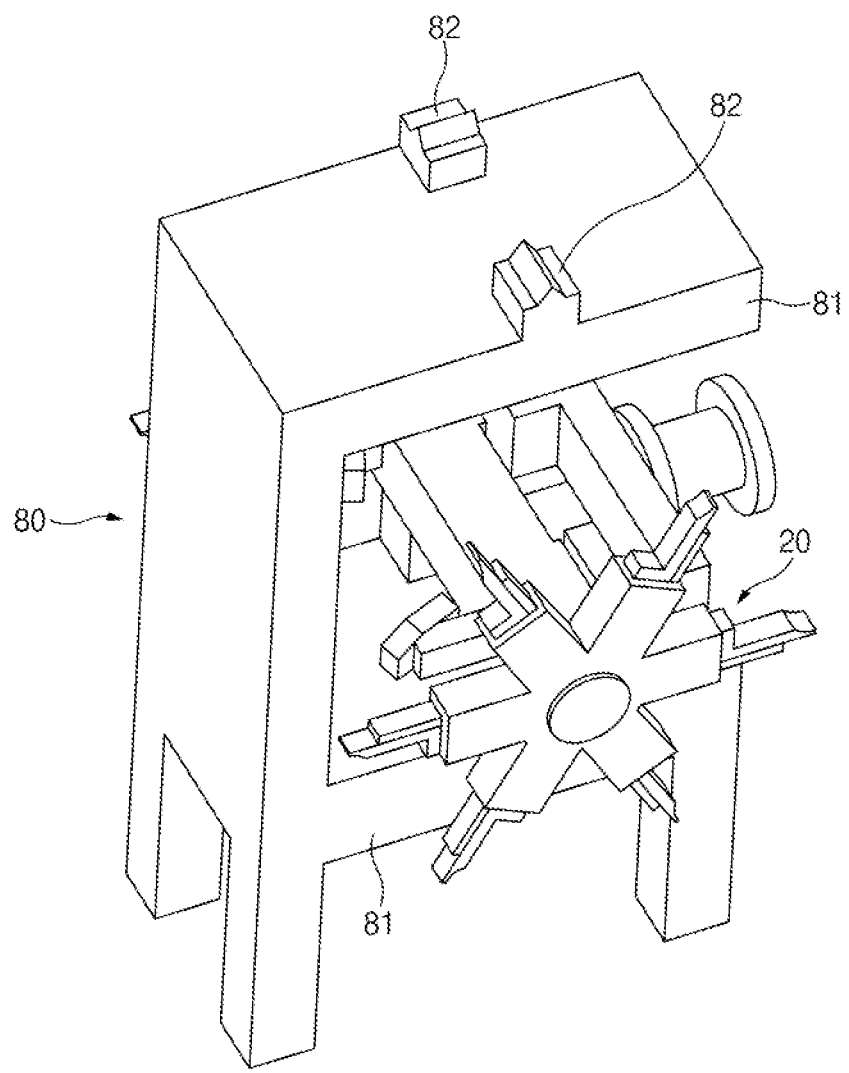
FIG. 9 is a perspective view illustrating the storage rack in which the X-direction regulation jig of the system for mounting the tailgate is stored, according to an embodiment of the present disclosure.

As illustrated in FIG. 8, an arm 65a of a transfer robot 65 may be coupled to the coupling part 23. Accordingly, the X-direction regulation jig 20 may be interposed between the roof panel 2 and the tailgate 1 by the transport robot 65.

The X-direction position of the tailgate 1 may be accurately regulated by the X-direction regulation jig 20.

Figure 4:
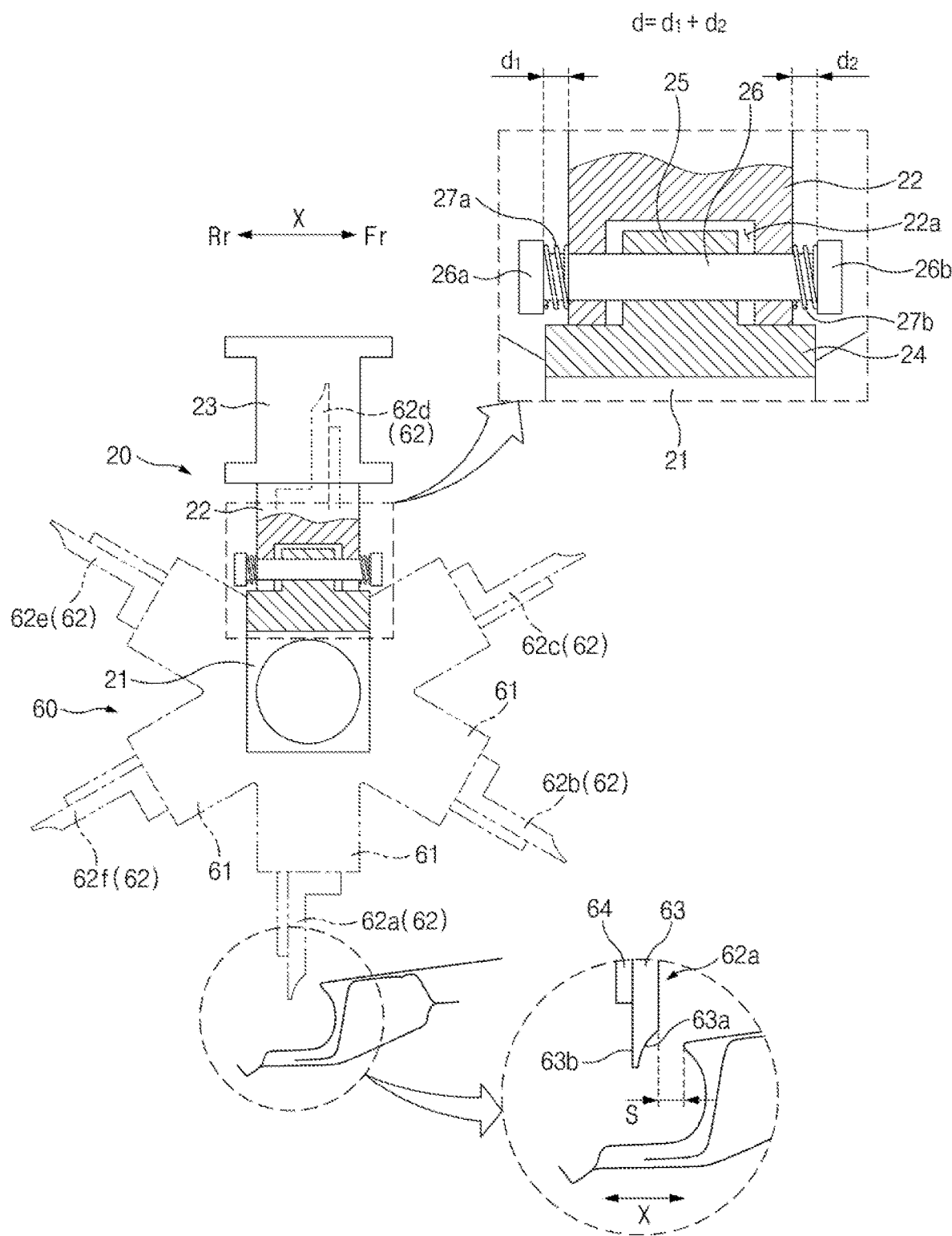
FIG. 4 is a view illustrating the state that the X-direction regulation jig of the system for mounting the tailgate approaches a roof panel, according to an embodiment of the present disclosure.

As illustrated in a lower enlarged view of FIG. 4, when the X-direction regulation jig 20 is moved to a position near to the roof panel 2 by the transfer robot 65, the regulation member 63 of the X-direction regulation arm 62 may be spaced apart from the roof panel 2 of the vehicle body by an initial distance S. For example, although the initial distance S may be set to about 2 mm, the initial distance S may be set to various values by a worker.

In this case, the springs 27a and 27b may have an initial length d. The initial length d of the springs 27a and 27b is the sum (d=d1+d2) of the initial length d1 of the first spring 27a and the initial length d2 of the second spring 27b.

Figure 5:
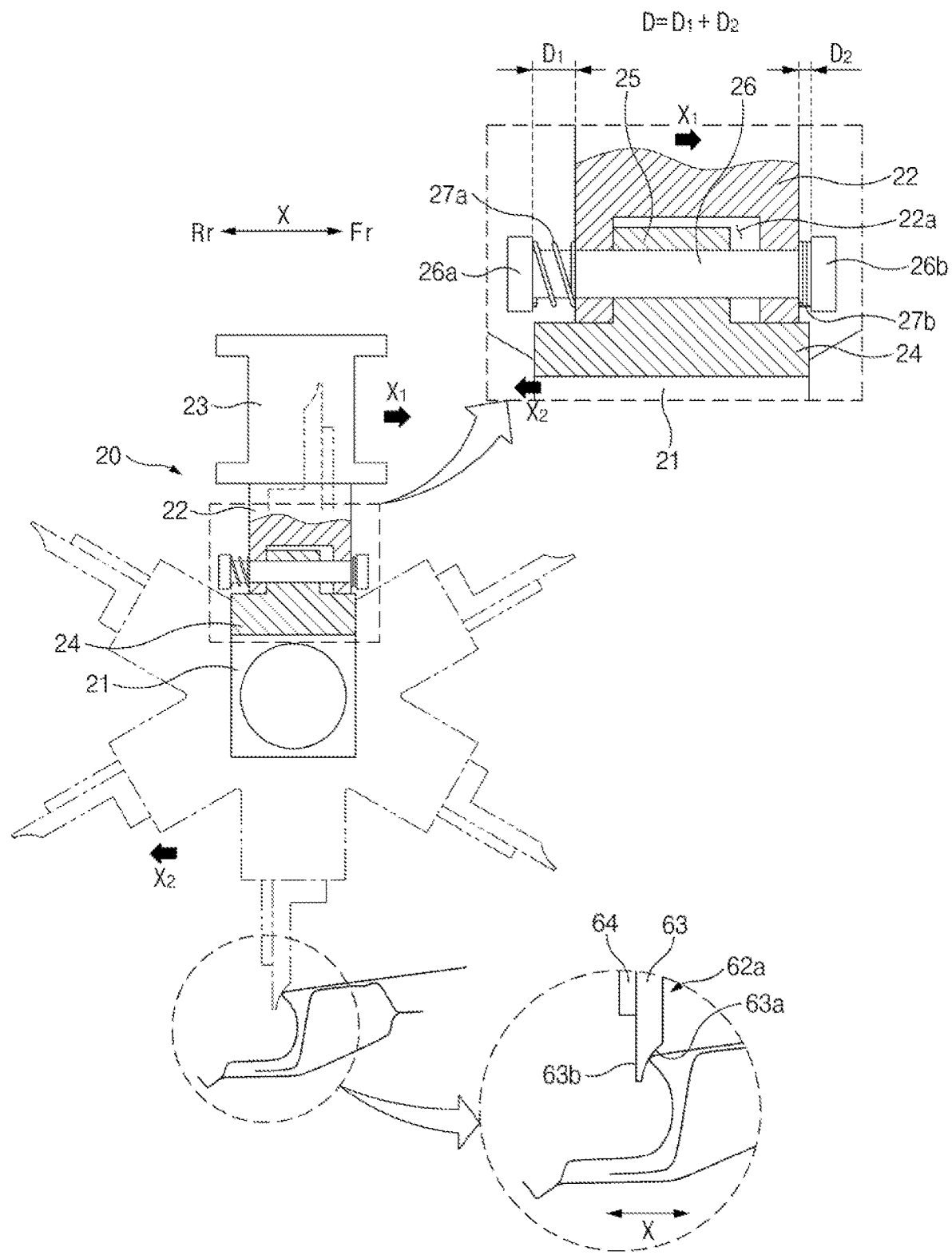
FIG. 5 is a view illustrating the state that the X-direction regulation jig of the system for mounting the tailgate is interposed between the roof panel and the tailgate, according to an embodiment of the present disclosure.

Thereafter, when the transfer robot 65 moves the X-direction regulation jig 20 toward the roof panel 2 by a predetermined distance (see an X1 direction of FIG. 5), the coupling part 23 and the second block 22 may be moved in the X1 direction, and the first block 21 may be moved in an X2 direction by reaction force of the springs 27a and 27b as illustrated in FIG. 5.

As illustrated in a lower enlarged view of FIG. 5, the first contact surface 63a of the regulation member 63 may make contact with the roof panel 2. In this case, the moving distance may be set to a value greater than the initial distance S. For example, although the moving distance is set to about 4 mm, the moving distance may be set to various values by the worker.

In this case, a length D of the springs 27a and 27b may be changed as the second block 22 and the first block 21 move relative to each other. The changed length D of the springs 27a and 27b IS the sum (D=D1+D2) of a changed distance D1 of the first spring 27a and a changed distance D2 of the second spring 27b.

In the state that the roof panel 2 makes contact with the first contact surface 63a of the regulation member 63, the tailgate 1 is moved in the X1 direction by the tailgate loading and mounting robot 40, thereby bringing the upper end of the tailgate 1 into contact with the second contact surface 63b of the regulation member 63.

As described above, as the regulation member 63 is interposed between the upper end of the tailgate 1 and the rear end of the roof panel 2, the distance between the tailgate 1 and the roof panel 2 may be accurately and uniformly maintained. In addition, as the second block 22 is elastically supported by the springs 27a and 27b, impact may be appropriately buffered when the regulation member 63 is interposed between the upper end of the tailgate 1 and the rear end of the roof panel 2.

Figure 6:
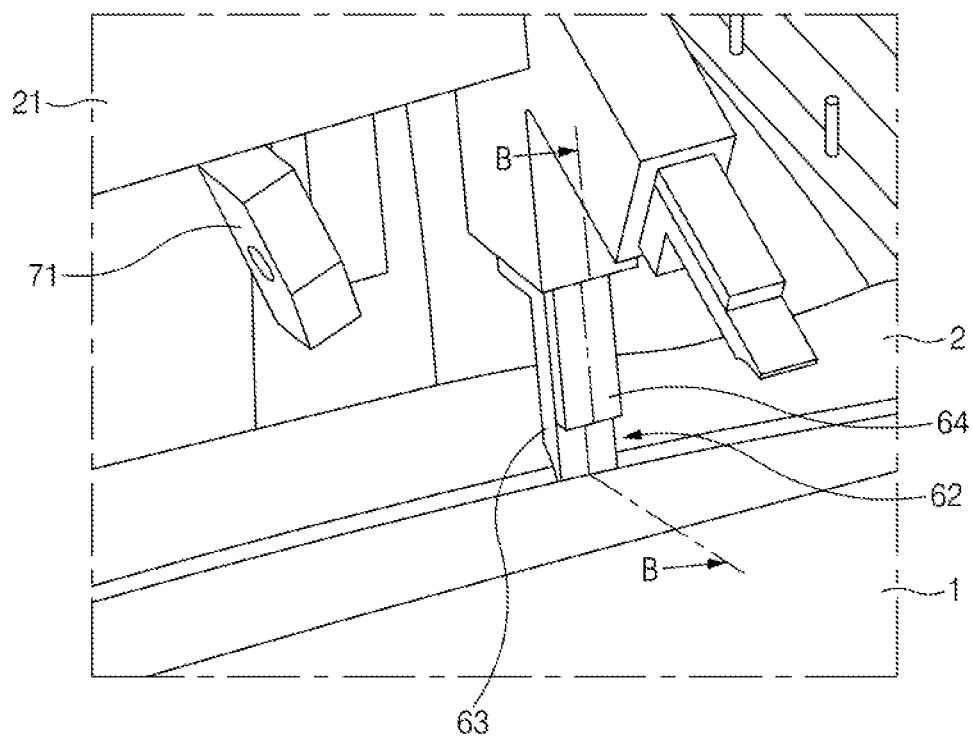
FIG. 6 is a perspective view illustrating the state that the X-direction distance between an X-direction regulation arm and the tailgate is measured by a first detection sensor provided in the X-direction regulation jig of the system for mounting the tailgate, according to an embodiment of the present disclosure.
Figure 13:
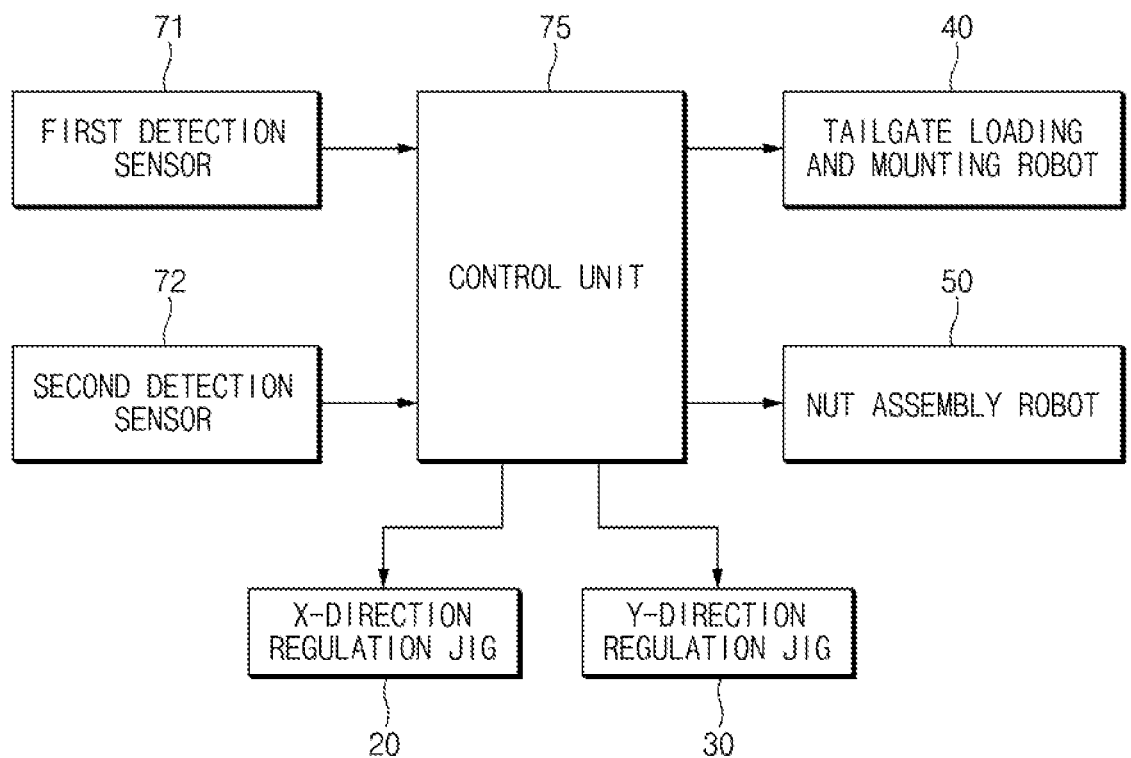
FIG. 13 is a block diagram illustrating a control configuration of the system for mounting the tailgate, according to an embodiment of the present disclosure.

As illustrated in FIGS. 2 and 6, at least one first detection sensor 71 may be mounted on the first block 21. The first detection sensor 71 may include a laser sensor and a camera. As illustrated in FIG. 13, the first detection sensor 71 may be connected with a control unit 75.

The control unit 71 may be a component of a computer's central processing unit (CPU) that directs the operation of the processor and may handle all processor control signals. The operation or microprogram of the control unit 71 may be encoded in a programmable logic array, random logic, read-only memory (ROM), or random-access memory (RAM).

Figure 7:
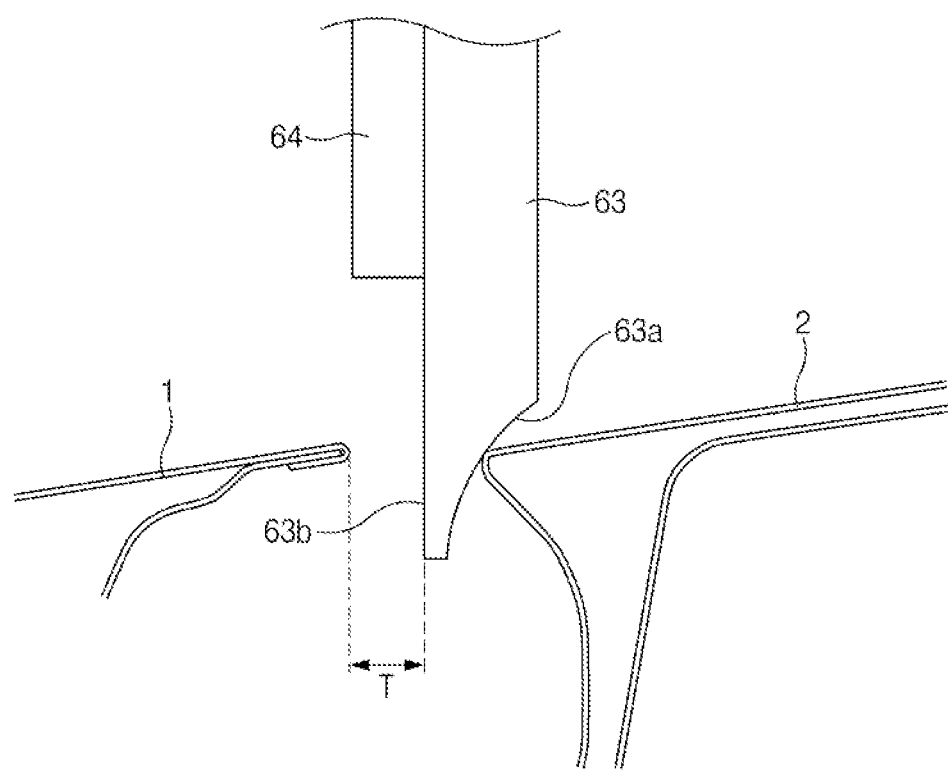
FIG. 7 is a sectional view taken along line B-B of FIG. 6.

Referring to FIGS. 6 and 7, after the laser sensor (not illustrated) of the first detection sensor 71 irradiates a laser beam to the space between the roof panel 2 and the X-direction regulation arm 62, and to the space between the X-direction regulation arm 62 and the tailgate 1, the camera may take a photograph of an X-direction distance T between the regulation member 63 of the X-direction regulation arm 62 and the tailgate 1. When the photograph is transmitted to the control unit 75, the control unit 75 performs an operation for pixels in a region of the photograph taken by the first detection sensor 71 and having no laser beam, thereby accurately calculating the X-direction distance T between the regulation member 63 of the X-direction regulation arm 62 and the tailgate 1.

According to an embodiment of the present disclosure, at least a pair of first detection sensors 71 may be mounted horizontally symmetrically to each other.

According to an embodiment of the present disclosure, a storage rack 80 may be further provided to store the X-direction regulation jig 20.

The storage rack 80 may include a plurality of shelves 81 vertically spaced apart from each other. Each shelf 81 may be formed on a top surface thereof with at least one seating protrusion 82 on which the X-direction regulation jig 20 is seated.

The storage rack 80 may be provided in a field production line of a vehicle. The X-direction regulation jig 20 stored in the storage rack 80 may be coupled to the arm 65a of the transfer robot 65 and then may be used for the mounting of the tailgate 1. After the X-direction regulation jig 20 is used, the X-direction regulation jig 20 may be simply stored in the storage rack 80.

The Y-direction regulation jig 30 may include a Y-direction regulation arm 31 which may regulate a Y-direction position of the tailgate 1.

The Y-direction regulation arm 31 may move in X, Z, and Y directions by an X-direction linear guide 32, a Z-direction linear guide 33, and a Y-direction linear guide 34, respectively.

The X-direction linear guide 32 may include an actuator 32a such as a driving motor, a guide body 32b extending in the X direction, and a slider 32c moving in the X direction along the guide body 32b. The guide body 32b may be provided therein with components, such as a guide rail and a transfer screw, which move the slider 32c.

The Z-direction linear guide 33 may include an actuator 33a such as a driving motor, a guide body 33b extending in the Z direction, and a slider 33c moving in the Z direction along the guide body 33b. The guide body 33b may be provided therein with components, such as a guide rail and a transfer screw, which move the slider 33c. The slider 32c is coupled to one side of the guide body 33b of the Z-direction linear guide 33. Accordingly, the Z-direction linear guide 33 may be moved in the X direction by the X-direction linear guide 32.

The Y-direction linear guide 34 may include an actuator 34a such as a driving motor, a guide body 34b extending in the Y direction, and a slider 34c moving in the Y direction along the guide body 34b. The guide body 34b may be provided therein with components, such as a guide rail and a transfer screw, which move the slider 34c. The slider 33c is coupled to the guide body 34b of the Y-direction linear guide 34 through a bracket 35. Accordingly, the Y-direction linear guide 34 may be moved in the Z direction by the Z-direction linear guide 33.

The Y-direction regulation arm 31 may be coupled to the slider 34c of the Y-direction linear guide 34.

Through the above configuration, as the Y-direction regulation arm 31 may move in X, Z, and Y directions by the X-direction linear guide 32, the Z-direction linear guide 33, and the Y-direction linear guide 34, respectively, the Y-direction regulation arm 31 may be adjacent to a lateral side of the tailgate 1.

According to an embodiment of the present disclosure, a pair of Y-direction regulation arms 31 may be provided horizontally symmetrically to each other about the tailgate 1.

Figure 10:
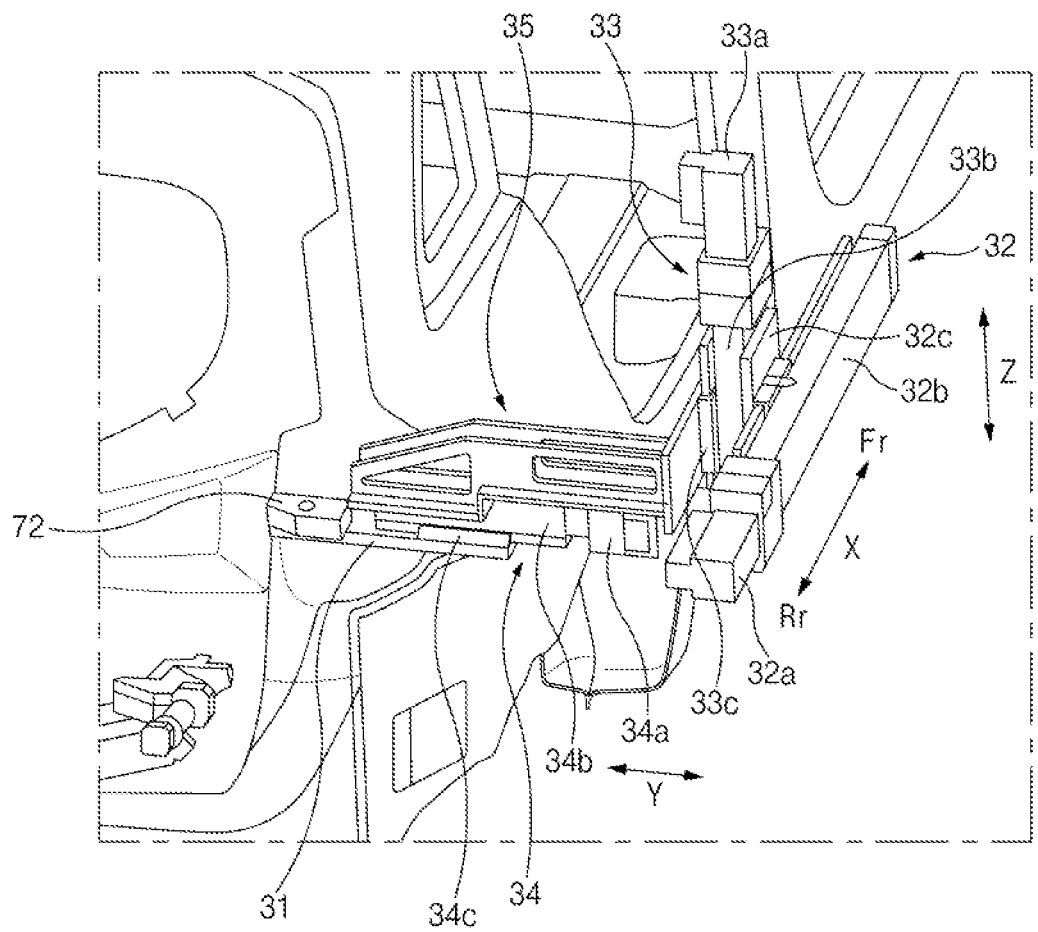
FIG. 10 is a perspective view illustrating a Y-direction regulation jig of the system for mounting the tailgate, according to an embodiment of the present disclosure.
Figure 11:
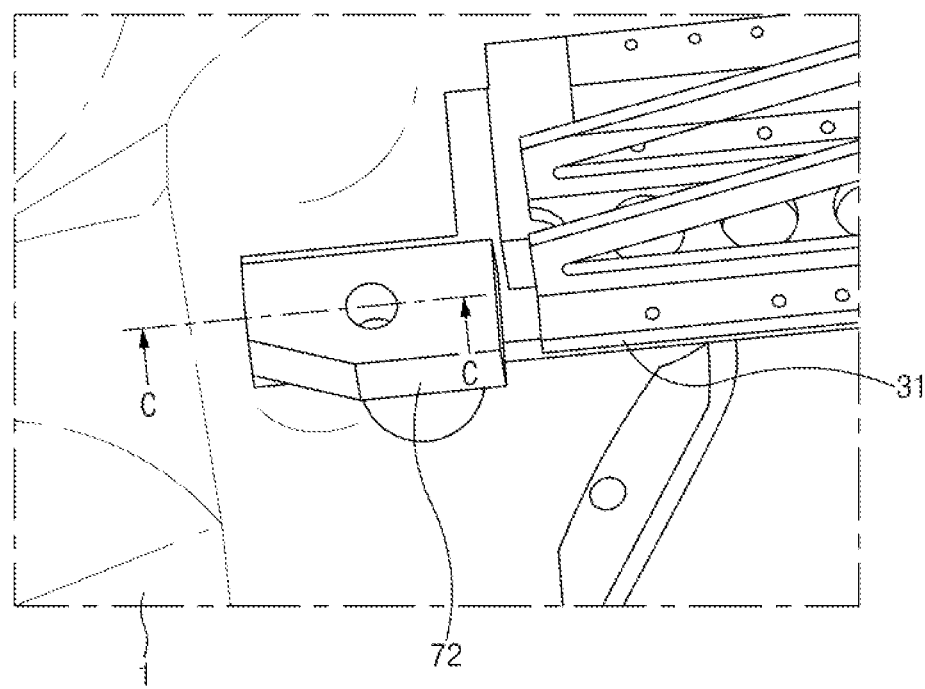
FIG. 11 is a perspective view illustrating that the Y-direction regulation jig of the system for mounting the tailgate approaches a right side surface of the tailgate, according to an embodiment of the present disclosure.
Figure 12:
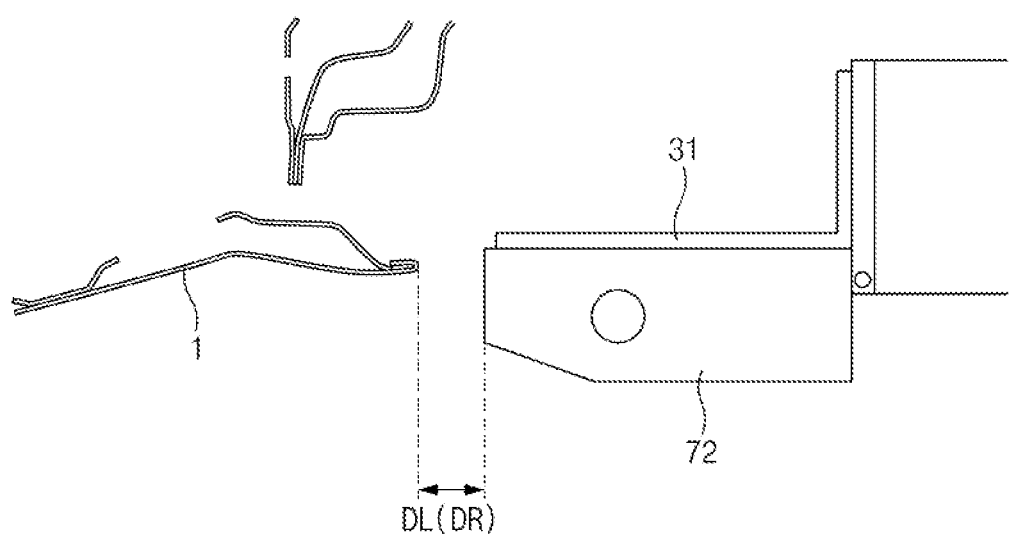
FIG. 12 is a sectional view taken along line C-C of FIG. 11.

As illustrated in FIGS. 10 to 12, a second detection sensor 72 may be mounted on a front end of the Y-direction regulation arm 31. The second detection sensor 72 may include a laser beam sensor. As illustrated in FIG. 13, the second detection sensor 72 may be connected with the control unit 75.

Referring to FIGS. 11 and 12, when a laser beam sensor (not illustrated) of the second detection sensor 72 irradiates a laser beam to the lateral side of the tailgate 1, a computation is performed with respect to the speed of the laser beam and the time at which the laser beam reflected from the lateral side of the tailgate 1 reaches the second detection sensor 72. Accordingly, a Y-direction distance DL between the Y-direction regulation arm 31 and the lateral side of the tailgate 1 may be accurately calculated.

According to an embodiment of the present disclosure, a pair of second detection sensors 72 are individually mounted in a pair of relevant Y-direction regulation arms 31. A Y-direction distance DR or DL between a right or left lateral side of the tailgate 1 and the Y-direction regulation arm 31 may be accurately measured.

Referring to FIG. 13, the control unit 75 may be connected with the first detection sensor 71 and the second detection sensor 72. The data measured by the first detection sensor 71 and the second detection sensor 72 may be transmitted to the control unit 75.

The control unit 75 may be connected with the X-direction regulation jig 20, the Y-direction regulation jig 30, the tailgate loading and mounting robot 40, and the nut assembly robot 50. Accordingly, the tailgate loading and mounting robot 40 and the nut assembly robot 50 are controlled using the data measured by the first detection sensor 71 and the second detection sensor 72. Accordingly, the positions of the tailgate 1, the X-direction regulation jig 20, and the Y-direction regulation jig 30 may be accurately corrected.

The control unit 75 may be connected with a computer (not illustrated) or constructed integrally with the computer. The history of the mounting quality of the tailgate may be computerized and managed by the computer. Accordingly, the mounting quality of the tailgate may be easily managed.

Figure 14:
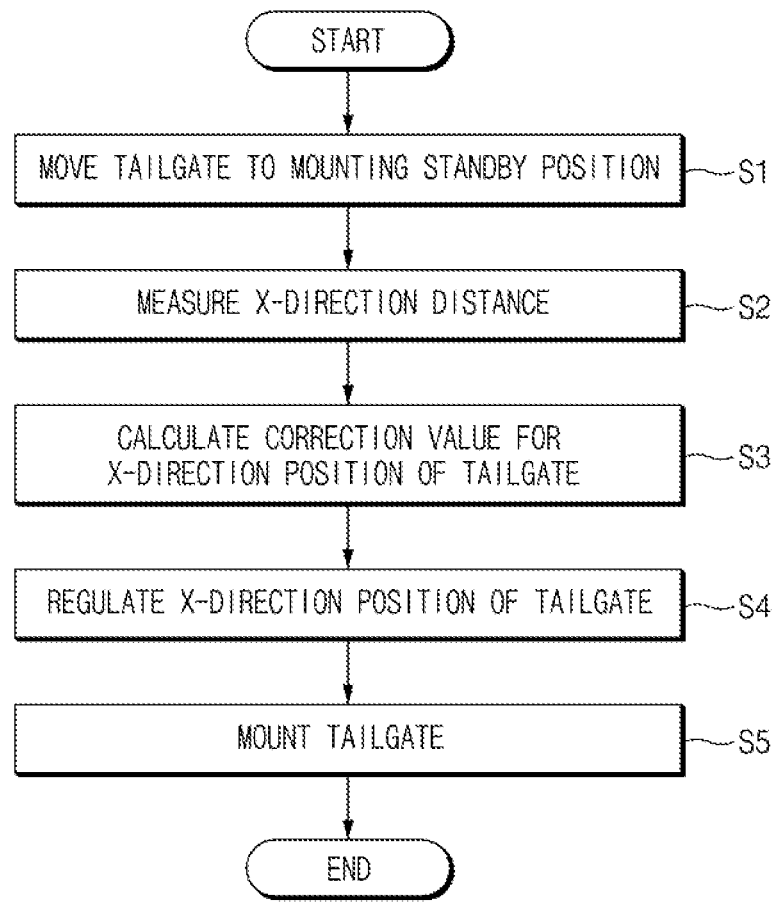
FIG. 14 is a flowchart illustrating a method for mounting the tailgate by using the X-direction regulation jig, according to the present disclosure.

FIG. 14 is a flowchart illustrating a method for mounting a tailgate using the X-direction regulation jig 20.

The tailgate 1 is moved to a mounting standby position by the tailgate loading and mounting robot 40 (S1). In addition, the X-direction regulation jig 20 is interposed between the tailgate 1 and the roof panel 2 by the transfer robot 65.

Then, as described above, the X-direction distance T between the tailgate 1 and the X-direction regulation arm 62 of the X-direction regulation jig 20 is measured by the first detection sensor 71 (S2).

Thereafter, the data of the X-direction distance T is transmitted to the control unit 75, and the control unit 75 calculates a correction value for the X-direction position of the tailgate 1 based on the X-direction distance T (S3).

The control unit 75 controls the tailgate loading and mounting robot 40 using the correction value for the X-direction position of the tailgate 1. Accordingly, the X-direction position of the tailgate 1 may be adjusted by the tailgate loading and mounting robot 40 (S4).

Next, the nut is automatically assembled to the hinge of the tailgate 1 by the nut assembly robot 50, thereby completing the mounting of the tailgate 1 (S5).

Figure 15:
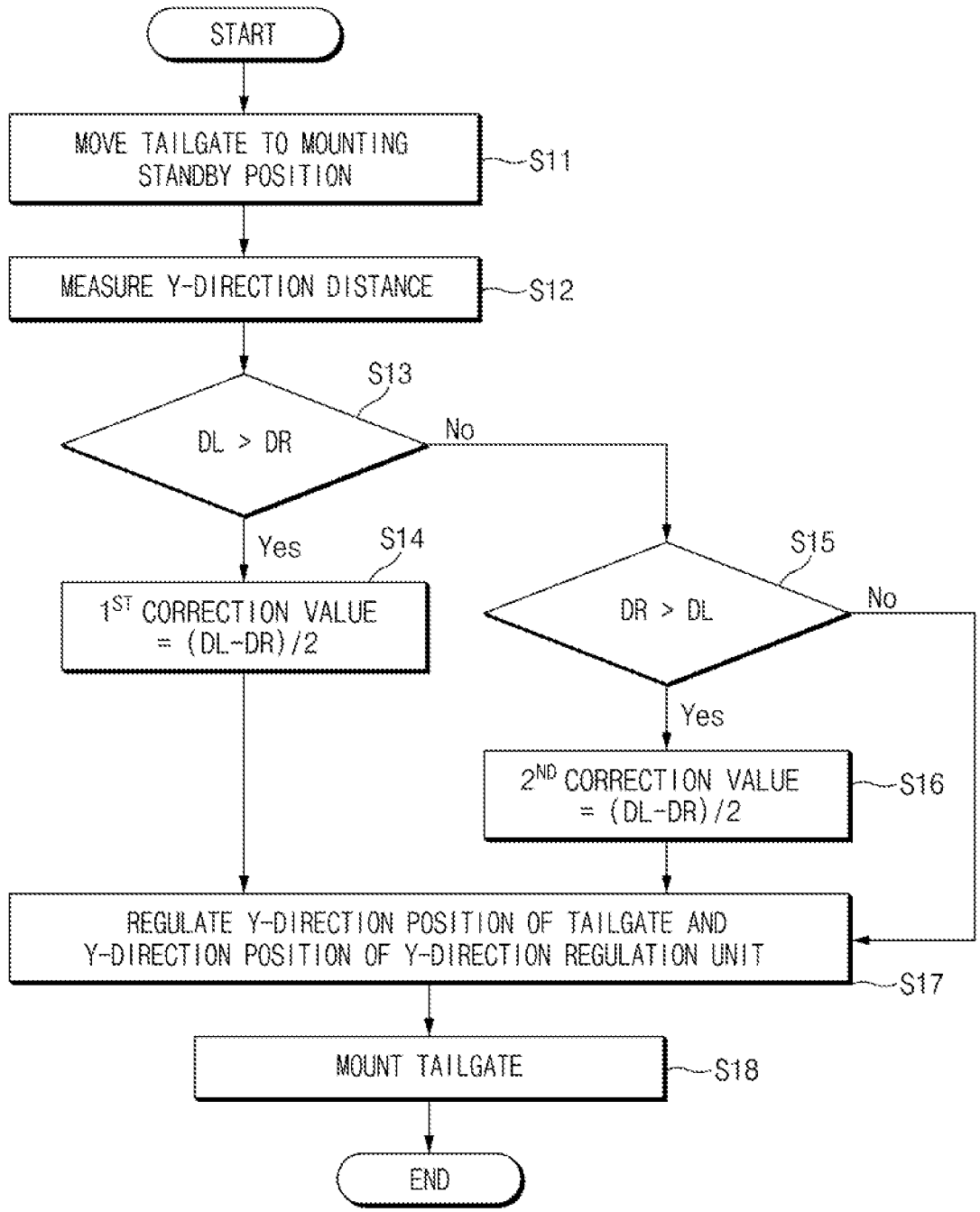
FIG. 15 is a flowchart illustrating a method for mounting the tailgate by using the Y-direction regulation jig, according to the present disclosure.

FIG. 15 is a flowchart illustrating the method for mounting the tailgate using the Y-direction regulation jig 30.

The tailgate 1 is moved to a mounting standby position by the tailgate loading and mounting robot 40 (S11). In addition, a pair of Y-direction regulation jigs 30 are respectively moved to a position near to a left and right lateral side of the tailgate 1.

Next, as described above, the Y-direction distance DR and DL between the right and left lateral side of the tailgate 1 and the Y-direction regulation arm 31 of each Y-direction regulation jig 30 is measured by the second detection sensor 72 (S12). In this case, the left Y-direction distance DL, which is a Y-direction distance between the left lateral side of the tailgate 1 and the Y-direction regulation arm 31 adjacent to the left lateral side of the tailgate 1, and the right Y-direction distance DR, which is a Y-direction distance between the right lateral side of the tailgate 1 and the Y-direction regulation arm 31 adjacent to the right side of the tailgate 1, are measured.

In addition, it is determined whether the left Y-direction distance DL is greater than the right Y-direction distance DR (S13). If the left Y-direction distance DL is greater than the right Y-direction distance DR, the first correction value ((DL−DR)/2) is calculated (S14).

Thereafter, it is determined whether the right Y-direction distance DR is greater than the left Y-direction distance DL (S15). If the right Y-direction distance DL is greater than the left Y-direction distance DR, the second correction value ((DR−DL)/2) is calculated (S16).

The control unit 75 moves the tailgate 1 based on the first correction value or the second correction value by the tailgate loading and mounting robot 40, and moves the Y-direction regulation unit 31 by the Y-direction regulation jig 30. The Y-direction position of the tailgate 1 and a Y-direction position of the Y-direction regulation arm 31 are regulated (S17).

Thereafter, the nut is automatically assembled to the hinge of the tailgate 1 by the nut assembly robot 50. Accordingly, the mounting of the tail gate 1 is finished (S18).

As described above, according to the present disclosure, the X-direction regulation jig includes a plurality of X-direction units for various vehicles. Accordingly, tailgates of the various vehicles may be significantly accurately and easily mounted on vehicle bodies.

The history of the mounting quality of the tailgate may be computerized and managed. Accordingly, the mounting quality of the tailgate may be easily managed, thereby improving the mounting quality of the tailgate and remarkably reducing the facility investment costs.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for automatically mounting a tailgate on a vehicle body, the method comprising:

moving the tailgate to a mounting standby position by a tailgate loading and mounting robot;

interposing an X-direction regulation jig between the tailgate and a roof panel by a transfer robot;

measuring an X-direction distance between the tailgate and the X-direction regulation jig by a first detection sensor;

calculating a correction value for an X-direction position of the tailgate based on the measured X-direction distance;

adjusting the X-direction position of the tailgate by the tailgate loading and mounting robot; and automatically assembling a nut to a hinge of the tailgate by a nut assembly robot, wherein the X-direction regulation jig includes:
  at least one X-direction regulation arm configured to regulate the X-direction position of the tailgate;
  a first block coupled to the X-direction regulation arm; and
  a second block mounted to the first block such that the second block is movable relative to the first block in an X-direction, wherein the X-direction regulation arm includes a regulation member configured to regulate a distance between the roof panel and the tailgate, wherein the regulation member includes:
  a first contact surface contactable with a rear end of the roof panel; and
  a second contact surface contactable with an upper end of the tailgate, wherein a mounting part is rotatably mounted on at least one end of the first block, wherein a plurality of X-direction regulation arms are mounted on the mounting part, and wherein the X-direction regulation arms are circumferentially spaced apart from each other.

* * * * *